(12) United States Patent
Christie

(10) Patent No.: US 6,285,296 B1
(45) Date of Patent: Sep. 4, 2001

(54) DIFFERENTIAL RANGE REMOTE CONTROL

(75) Inventor: Scott Christie, Weymouth, MA (US)

(73) Assignee: Audiovox Corporation, Hauppauge, NY (US)

(*) Notice: Subject to any disclaimer, the term of this patent is extended or adjusted under 35 U.S.C. 154(b) by 0 days.

(21) Appl. No.: 08/337,095

(22) Filed: Nov. 10, 1994

(51) Int. Cl.[7] .................................................. H01H 47/20
(52) U.S. Cl. ............................... 340/825.69; 340/825.72; 340/5.3
(58) Field of Search ........................... 340/825.3, 825.31, 340/825.57, 825.62, 825.69, 825.34, 825.72, 825.77; 341/176; 455/116

(56) References Cited

U.S. PATENT DOCUMENTS

| | | | |
|---|---|---|---|
| 3,725,939 | * 4/1973 | Saltzstein | 340/825.77 |
| 4,763,121 | * 8/1988 | Tomoda et al. | 340/825.54 |
| 4,918,431 | * 4/1990 | Borras | 340/825.31 |
| 5,046,081 | * 9/1991 | Umemoto | 455/116 |
| 5,157,389 | * 10/1992 | Kurozu et al. | 340/825.32 |
| 5,281,970 | * 1/1994 | Blaese | 341/176 |
| 5,319,364 | * 6/1994 | Waraksa et al. | 340/825.72 |
| 5,355,525 | * 10/1994 | Lindmayer et al. | 340/825.69 |
| 5,379,033 | * 1/1995 | Fujii et al. | 340/825.69 |
| 5,469,152 | * 11/1995 | Yamamoto | 340/825.69 |

* cited by examiner

*Primary Examiner*—Michael Horabik
(74) *Attorney, Agent, or Firm*—Greenberg Traurig, LLP

(57) ABSTRACT

A remote-control vehicle lock-and-alarm system provides improved security against "code-grabber" devices used to detect and counterfeit the codes used by a vehicle lock-and-alarm system. Two sets of control codes are provided. One set of control codes that does not affect the security status of the lock-and-alarm system is transmitted over a maximum range, for the sake of convenience. The other set of control codes is used for critical security features which change the security status of the lock-and-alarm system and is transmitted over a much shorter range to prevent detection and counterfeiting of the control codes.

14 Claims, 2 Drawing Sheets

DIFFERENTIAL RANGE REMOTE CONTROL

BACKGROUND OF THE INVENTION

1. Field of the Invention

The present invention pertains to remote-control actuators. More particularly, the present invention pertains to the remote control of security systems.

2. Discussion of Related Art

Improvements in the design of remote-control devices for vehicle locking and alarm systems have increased the effective operating range of hand-held, keychain transmitters, which is now typically 75 feet to 150 feet. Operating range has frequently been mistakenly assumed to be desirable for its own sake. The progressive increase in the operating range is primarily due to the incorporation of features such as the remote car starting, remote trunk release, and remote window control, which provide improved security and convenience.

However, as the range of the convenience signals has increased, the range of the arming and disarming signals which are critical to the vehicle's security has also been increased. This has, unintentionally, worked to the benefit of today's sophisticated car thief, who now has a device known in the industry as a "code grabber".

This thief waits in a concealed area near the vehicle, within the operating range of the transmitter, until the vehicle's operator returns and transmits the disarm signal. The code grabbing device receives and stores the operator's disarm signal, which can now be retransmitted by the code-grabber device at a later time, disarming the vehicle's alarm system and even unlocking and starting the vehicle for use by an unauthorized person, the thief.

In particular, most automotive alarm systems generate an audible tone or series of tones ("chirps") when armed or disarmed, which provide an audible indication to the user that the alarm system has indeed received the radio frequency (RF) signal from the transmitter and is responding. Many of these alarm systems also provide one or more flashes of the vehicle's exterior lights as an added visual indication that the alarm system is responding to the hand-held transmitter.

Many of these alarm systems provide some means of eliminating the tone or series of tones that are sounded when arming and disarming the vehicle's security system ("chirp delete"). These methods range from the installer activating a small dip switch located on the alarm controller module or cutting a wire loop on the alarm controller module to the operator's repeated activation of a dashboard-mounted alarm control switch, pressing buttons on the keychain RF transmitter in a complex sequence which modifies the response of the remote control receiver.

There are several problems with these methods of chirp control. Systems that are installed with the audible chirp tones set either on or off cannot easily be changed by the alarm operator. Methods that do allow remote control by the operator are awkward to operate. They often leave the operator guessing, because they do not provide adequate confirmation. Push-button sequences are inconvenient because they are easy to forget and they are easily confused with the sequences that control other functions.

Additionally, these methods all set the alarm system controller into either a tone or no-tone mode of operation, and the system remains in that mode until the mode selection procedure is repeated. Thus the chirp delete option is generally not used.

SUMMARY OF THE INVENTION

The present invention greatly reduces the effective area in which a car thief can hide while operating a code grabbing device. It is much more difficult for the thief to conceal himself close to where the RF keychain transmitter is actuated, rather than 100 feet away.

This reduces the probability that a given vehicle can be stolen using a code grabber, thus reducing the overall number of such vehicles stolen and, hopefully, reducing the vehicle operators' insurance premiums.

The present invention also provides a novel method of addressing the chirp delete feature. As the operator approaches the vehicle, system is armed and the operator presses the disarm button on the RF keychain transmitter for a short period of time, e.g., 0.5 seconds or less. The alarm system will then disarm and flash the vehicle's parking lights as a visual confirmation, with a chirp for an audible confirmation. Alternatively, if the operator approaches the vehicle and holds the disarm button on the RF keychain transmitter pressed down for a slightly longer period of time, say between 0.5 seconds and 1.5 seconds, the alarm system disarms and provides visual confirmation, but there is no audible confirmation—the chirp is silent.

When the operator leaves the vehicle, the alarm system is disarmed and, if the arm button on the RF keychain transmitter is pressed for a short period of time, say 0.5 seconds, the alarm system will arm and provide a light flash and a chirp. Holding the arm button on the RF keychain transmitter down for the slightly longer period, 0.5 seconds to 1.5 seconds, causes the system to arm, but only flash the lights, not chirp.

The present invention provides a unique multi-range RF keychain transmitter circuit that reduces the effectiveness of code-grabber devices. The transmitted RF codes that control security features such as remote disarming and remote door unlock will have a limited operating range, which reduces the risk of automobile theft.

Another aspect of the invention provides a variable-range RF keychain transmitter that permits the transmission of codes that control convenience features such as remote car starting, remote trunk and window control, and remote headlight control, over a substantially greater operating range while preventing code-grabbing devices disarming the vehicle's security system and unlocking the vehicle.

Another object of the invention is to provide an easily operated means of remotely selecting whether audible confirmation will or will not be provided during any given arm or disarm activation of the system.

BRIEF DESCRIPTION OF THE DRAWINGS

The invention will be more clearly understood when the detailed description of preferred embodiments given below is considered in conjunction with the drawings provided, wherein.

DETAILED DESCRIPTION OF THE PREFERRED EMBODIMENTS

Figure 1:
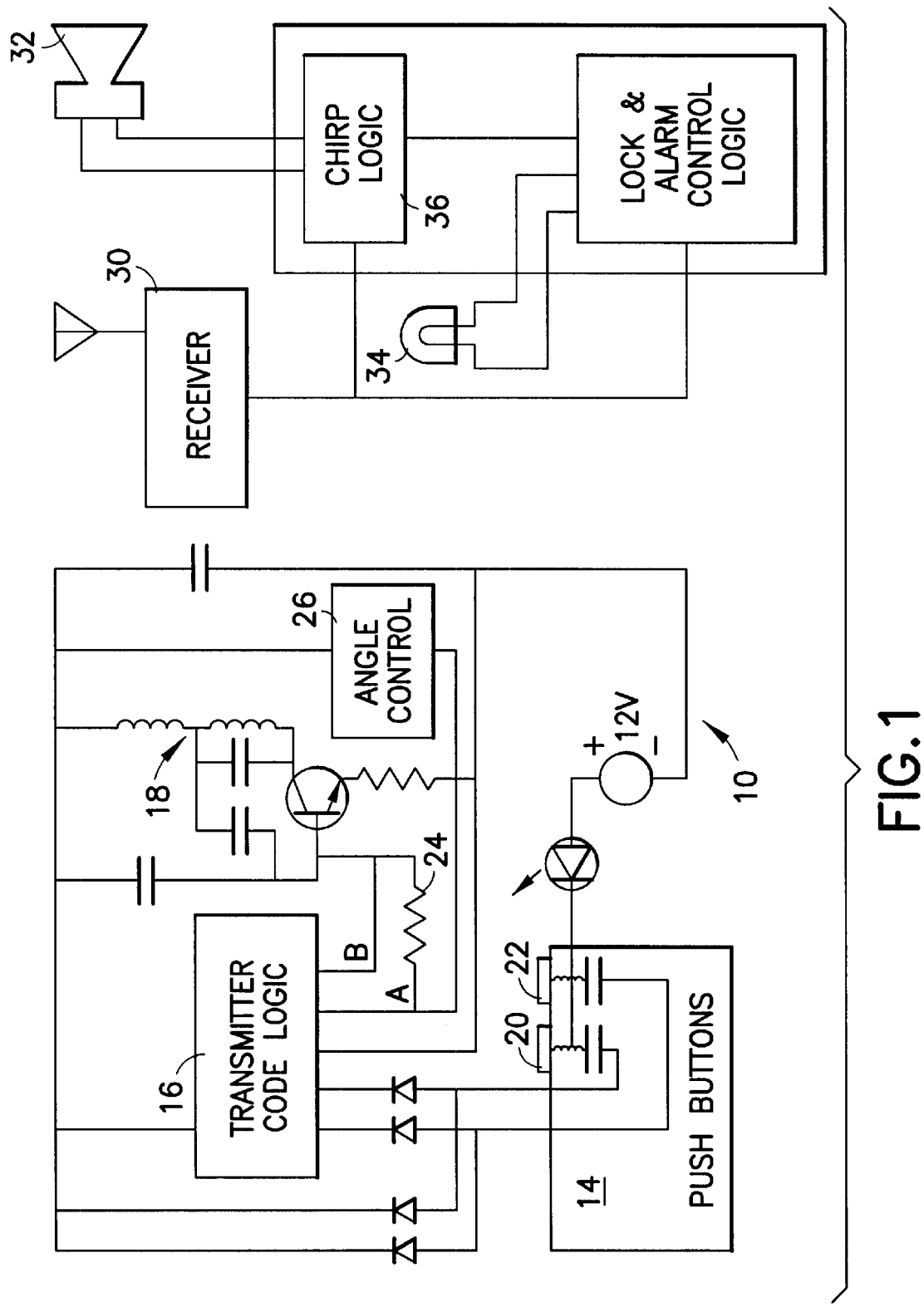
FIG. 1 is a schematic block diagram of a variable range transmitter in accordance with the present invention.

FIG. 1 shows a vehicle security control transmitter 10 having push buttons 14 that actuate transmitter code logic 16 to selectively provide first and second digital code signals A, B to an RF output circuit 18. The first and second signal paths A, B, provides signals that actuate given critical and non-critical functions of the security system, respectively.

For example, if a first button is briefly pressed and released, when the vehicle is locked and armed, the remote control receiver for the security system installed in the vehicle interprets that signal as a non-critical command: start the engine. If that first button is briefly pressed and released, when the vehicle is unlocked and disarmed, the remote control receiver for the security system installed in the vehicle interprets that signal as a non-critical command: open the trunk.

However, pressing that button 20 in combination with the other button 22 when the vehicle is locked and armed, will be interpreted by the transmitter code logic 16 as a critical command that would compromise the security of the vehicle's contents: open the trunk even though the vehicle's doors are still locked. Similarly, because the other button 22 controls whether or not the vehicle is locked and armed, pressing that button will be interpreted by the transmitter code logic 16 as a critical command that would compromise the security of the vehicle, regardless.

Figure 2:
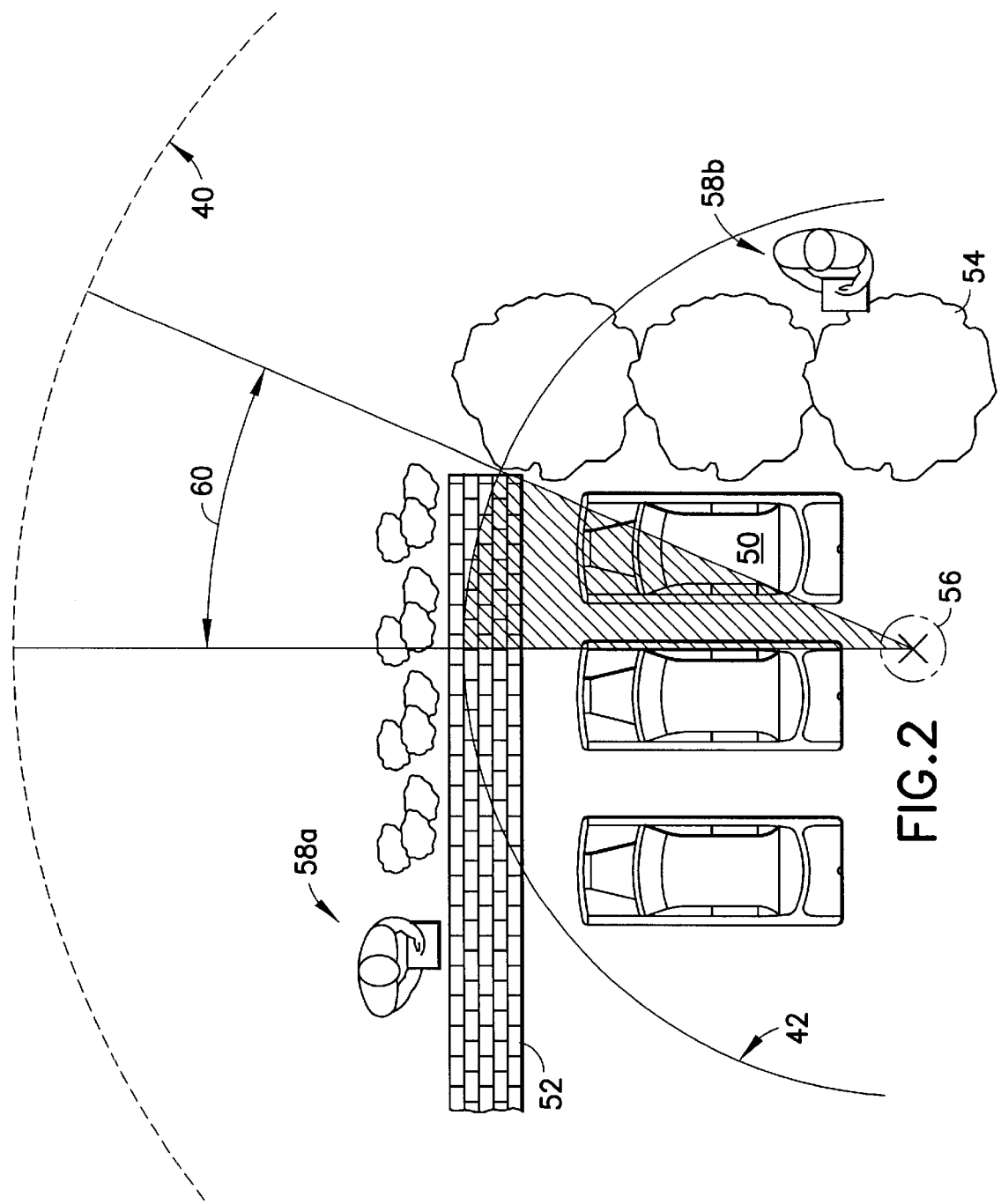
FIG. 2 is a plan view of the first and second RF transmission patterns of the transmitter shown in FIG. 1.

When the commands that are critical to vehicle security are broadcast, the transmitter reduces the power of the transmitted RF signal by adding resistance 24 to the first signal path A that reduces the power supplied over that path to the RF output circuit 18 that drives the transmitter's antenna. When the power supplied to the transmitter is reduced, the broadcast range of the transmitter is severely limited, as illustrated in FIG. 2.

Preferably, when commands that are critical to vehicle security are broadcast, the switching of the output of the transmitter code logic to the "A" path also limits the divergence of the transmitted RF signal to a more secure, narrow broadcast pattern. This pattern may be limited to a small angle of view by an angle control device 26 in any of the suitable ways known in the art.

One exception to this is "panic" mode operation, when either or both buttons are pushed and held for longer than 1.5 minutes. This causes flashing of all exterior lights and activation of the horn to ward off intruders. It is desirable to be able to use the transmitter's maximum range for panic mode, regardless of which button or buttons are pressed.

Another exception is chirp delete. Chirp delete can be actuated as a modification one of the security functions controlled by the second button 22 on keychain RF transmitter 10 without complicating the critical security functions of the transmitter, as explained below.

Preferably, the receiver 30 is able to respond to the non-critical commands from the remote control transmitter 10 over a range of 75 to 150 feet in any direction, for the sake of convenience. This range is indicated by the portion of the dashed circle 40 shown in FIG. 2. For safety's sake, the reduced power used to broadcast commands that activate functions affecting the security of the vehicle limits the transmitter's signal to a much shorter range, 10 to 15 feet for example, as shown by the inner circle 42.

It is much more difficult for the thief to conceal himself within a 10-foot range 42 of the operator 56 who activates the RF keychain transmitter rather than at a range of a 100 feet or more, as illustrated in FIG. 2. Specifically, FIG. 2 shows the driver's car 50 parked in a suburban parking lot, surrounded by a basket-weave fence 52 and dense shrubs 54. Also two people 58a and 58b, potential thieves, are lurking near by in the bushes and armed with code-grabbers.

As the operator 56 approaches the vehicle 50, the system is armed and the operator presses the disarm button 22 on the RF keychain transmitter 10 for a short period of time, e.g., 0.5 seconds. The alarm system will then disarm, the chirp 32 will be actuated, as an audible confirmation, and the vehicle's parking lights 34 will flash to provide visible confirmation.

If the operator approaches the vehicle and holds the disarm button on the RF keychain transmitter pressed down for a slightly longer period of time, say between 0.5 seconds and 1.5 seconds, the alarm system will disarm and flash the vehicle's parking lights to provide visible confirmation, but the chirp logic 36 will silence the chirp 32, so as not to wake the neighbors and alert potential thieves.

Either way, thief 58a will be unable to obtain this critical vehicle security code. However, in the worst case, unless the divergence of the transmitted signal is also limited to the secure angle 60, thief 58b will record and be able to reproduce the signal that unlocks and disarms this particular vehicle 50. Some operators may find that limiting the short-range RF transmission pattern to a narrow angle 60 about the line of sight may make actuation of the short-range functions unreliable, but the combination of limited angle 60 and limited range 42 does provide improved security.

The invention has been described with particular reference to the presently-preferred embodiments of the invention. It will be apparent to one skilled in the art that modifications and variations are possible within the spirit and scope of this invention. For instance, the range of the critical commands transmitted by the remote control may be limited by means other adding resistance at the input to the transmitter output circuit. Also, the broadcast pattern may be lobed rather than merely narrowed, to protect critical commands from code grabbing. The invention is defined by the appended claims.

I claim:

1. An apparatus for remotely controlling a vehicle security system, the apparatus comprising:

a transmitter for transmitting a first signal which changes a security status of the vehicle security system and a second signal which does not change the security status of the vehicle security system, said transmitter transmitting said first signal throughout a first range and transmitting said second signal throughout a second range, said first range being smaller than said second range.

2. The apparatus of claim 1, wherein said transmitter includes a first signal path for transmitting said first signal throughout said first range and a second signal path for transmitting said second signal throughout said second range.

3. The apparatus of claim 2, wherein said first signal path includes a limiter for limiting an area of signal transmission for said first signal to said first range.

4. The apparatus of claim 3, wherein said limiter comprises at least one resistor.

5. The apparatus of claim 2, wherein said first signal path comprises a limiter for limiting an angle of signal transmission for said first signal.

6. The apparatus of claim 1, further comprising a first actuator electrically connected to said transmitter for actuating said transmitter to transmit said first signal and a second actuator electrically connected to said transmitter for actuating said transmitter to transmit said second signal.

7. The apparatus of claim 1, wherein said first signal includes first transmission codes which control a disarming/arming operation of the vehicle security system and a locking/unlocking operation of vehicle doors.

8. A vehicle security system comprising:
- a vehicle alarm for detecting and indicating unauthorized access to a vehicle and for locking/unlocking vehicle openings;
- a receiver for receiving signals for arming/disarming the vehicle alarm; and
- a transmitter for transmitting to the receiver a first signal for changing a security status of the vehicle security system and a second signal which does not change the security status of the vehicle security system, said transmitter transmitting said first signal throughout a first range and transmitting said second signal throughout a second range, said first range being smaller than said second range.

9. The vehicle security system of claim 8, wherein said transmitter includes a first signal path for transmitting said first signal throughout said first range and a second signal path for transmitting said second signal throughout said second range.

10. The vehicle security system of claim 9, wherein said first signal path includes a limiter for limiting an area of signal transmission for said first signal to said first range.

11. The vehicle security system of claim 9, wherein said first signal path comprises a limiter for limiting an angle of signal transmission for said first signal.

12. A method for remotely controlling a security system, the method comprising the steps of:
- transmitting a first signal which changes a security status of the security system throughout a first range; and
- transmitting a second signal that does not change the security status of the security system throughout a second range which is greater than the first range.

13. The method of claim 12, further comprising the step of limiting an angle of signal transmission of said first signal.

14. The method of claim 12, further comprising the step of reducing electrical power of said first signal before transmitting said first signal so as to reduce a range of signal transmission of said first signal.

* * * * *